(12) United States Patent
Krauss

(10) Patent No.: US 6,755,433 B2
(45) Date of Patent: Jun. 29, 2004

(54) TRANSPORTABLE STORAGE CONTAINER ASSEMBLY

(76) Inventor: Gerald W. Krauss, 2620 Brookfield Ct., Columbia, IL (US) 62236

( * ) Notice: Subject to any disclaimer, the term of this patent is extended or adjusted under 35 U.S.C. 154(b) by 0 days.

(21) Appl. No.: 10/151,401

(22) Filed: May 20, 2002

(65) Prior Publication Data

US 2002/0180179 A1 Dec. 5, 2002

Related U.S. Application Data

(60) Provisional application No. 60/294,458, filed on May 30, 2001.

(51) Int. Cl.[7] .............................................. B60D 1/50
(52) U.S. Cl. ............................ 280/456.1; 280/460.1; 280/491.1
(58) Field of Search .......................... 280/456.1, 460.1, 280/495, 500, 491.1, 78, 86.5, 763.1, 767, 501, 504, 511

(56) References Cited

U.S. PATENT DOCUMENTS

| | | | |
|---|---|---|---|
| 3,787,068 A | * 1/1974 | Miller | 280/446.1 |
| 3,877,714 A | 4/1975 | Black | 280/34 |
| 4,042,255 A | * 8/1977 | Drewek et al. | 223/34 |
| 4,053,072 A | * 10/1977 | Ross et al. | 414/495 |
| 4,078,821 A | 3/1978 | Kitterman | 280/460 |
| 4,266,796 A | * 5/1981 | Riggs et al. | 280/414.1 |
| 4,480,851 A | * 11/1984 | St-Pierre | 280/656 |
| 4,512,593 A | * 4/1985 | Ehrhardt | 280/460.1 |
| 4,615,534 A | * 10/1986 | Blain | 280/47.331 |
| 4,664,403 A | * 5/1987 | Livingston | 280/460.1 |
| 4,950,010 A | * 8/1990 | Denny | 293/117 |
| 5,005,846 A | * 4/1991 | Taylor | 280/30 |
| 5,324,160 A | * 6/1994 | Smith | 414/475 |
| 5,397,148 A | * 3/1995 | Nelson | 280/416.1 |
| 5,520,404 A | * 5/1996 | Schulte | 280/460.1 |
| 5,531,468 A | * 7/1996 | White | 280/463 |
| 5,562,391 A | 10/1996 | Green | 414/500 |
| 5,639,139 A | * 6/1997 | Rush | 296/26.08 |
| 5,664,796 A | * 9/1997 | Huyzers | 280/400 |
| 5,725,037 A | 3/1998 | Faulhaber | 144/285 |
| 5,788,135 A | 8/1998 | Janek | 224/527 |
| 6,168,058 B1 | 1/2001 | Janek | 224/527 |
| 6,357,778 B1 | * 3/2002 | Ross | 280/456.1 |

* cited by examiner

Primary Examiner—Lesley D. Morris
Assistant Examiner—L. Lum
(74) Attorney, Agent, or Firm—Polster Lieder Woodruff & Lucchesi L.C.

(57) ABSTRACT

A transportable storage container assembly for transport by a tow vehicle. The assembly includes a trailer having a center rail with a two-point trailer hitch at the front end and a pivotable single wheel at the rear end. The trailer has a first cross channel adjacent the front end of the rail and a second cross channel adjacent the rear end of the rail. A storage container mounted on the trailer includes bottom support skids at each end that seat in the cross channels and are secured in the channels by casters that are attached to the skids through mounting holes in the cross channels. There is a jack on the bottom of the trailer rail adjacent the midpoint to facilitate the raising of the trailer for attachment to, and disattachment from, the tow vehicle trailer hitch.

22 Claims, 6 Drawing Sheets

TRANSPORTABLE STORAGE CONTAINER ASSEMBLY

CROSS-REFERENCE TO RELATED APPLICATIONS

This application claims priority to provisional application Serial No. 60/294,458, filed May 30, 2001.

BACKGROUND OF THE INVENTION

The invention relates generally to construction equipment and more specifically an improved storage container and trailer combination assembly that allows a single user to transport a storage container back and forth to a work site easily and efficiently.

A construction industry storage container is commonly referred to as a "job box". Job boxes can be purchased from various construction supply companies and some retail outlets. Most job boxes fall within a general size range and employ a substantially uniform design and construction. Job boxes are used by contractors and sub-contractors for the purpose of carrying tools and construction supplies to a job site. The job box usually remains at the site until the project is completed.

A typical job box being 36 inches tall, 60 inches long and 30 inches wide, weighs approximately 300 pounds, including the castors. There can be over 200 pounds of construction tools and supplies in the box, making the total weight of the loaded job box over 500 pounds. It takes a minimum of two persons, and as many as four persons, to lift a job box into a truck, even if the box is empty. If a project only requires one tradesman and one job box, loading, transporting, and unloading of that job box still requires at least one additional person, sometimes more. Traditional loading and transportation of a job box to a job site can be an inefficient and costly exercise for contractor or construction company.

A serious problem arises when small independent contractors, tradesmen, or other one person operations use job boxes. Such individuals cannot employ a job box at a job site without recruiting temporary help to load and unload the box. Small companies or individuals are often restricted to using a pickup truck with a camper shell, or a station wagon, loaded down with all the tools and extra supplies needed for the job. Consequently, it would be advantageous to provide an apparatus and method for transporting a storage container to a job site that can be easily used by an individual.

SUMMARY OF THE INVENTION

It is among the principal objects of the invention to provide an apparatus that will allow one individual to conveniently transport and use a construction storage container. The construction storage container and trailer assembly of the present invention allows the tow vehicle's cargo area to remain available for additional construction materials.

Briefly stated, a storage box and trailer assembly is provided having a single rail trailer with a pivotable, single wheel design used primarily to haul a conventional construction site storage container. ("Job Box"). The assembly includes a trailer that can be attached to any tow vehicle. The trailer includes a single, central beam or rail. There is a trailer hitch apparatus at the front end of the rail that attaches to the tow vehicle in a two-point attachment configuration so as to prevent tipping of the trailer. There is a single wheel at the rear end of the rail. The single wheel is pivotable to as to be rotated to a down position to engage the road and rotated to an up and out of the way position when the job box is set at a job site. There is a first cross channel adjacent the front end of the rail and a second cross channel adjacent the rear end of the rail. There are holes formed in ends of each cross channel. The cross channels are positioned so that the support skids on the bottom of each end of the job box rest in the respective channels. The job box caster bolts are introduced through the holes in the ends of the channels and secured in the skids to hold the job box on the trailer. There is a jack on the bottom of the rail to facilitate the raising of the trailer for attachment to and disattachment from the tow vehicle trailer hitch and to raise and lower the rear wheel assembly.

The job box is removably attached to the trailer by the casters but in use is left mounted on the trailer. Consequently the heavy job box can be attached to vehicle and detached easily by one person. The combination is sized to pass through a normal sized entry door of residential or commercial construction.

The exemplary embodiment of the job box trailer assembly of the present invention utilizing the job box can also be useful for any type of small item delivery, or sample carrying. This same job box trailer assembly can be easily adapted, with the use of attachments, to recreational uses, i.e. to transport luggage, personal belongings, motor cycles, bicycles, camping equipment or the like.

The exemplary embodiment of job box trailer assembly of the present invention can be adapted to use with any vehicle that can be equipped with an under-frame trailer hitch, Class II–V for pickup trucks, SUV's, and cars of all sizes. It can also be used with a pickup truck having only a step bumper.

The job box trailer assembly of the present invention allows transportation of a job box by an individual without extra help. By utilizing the job box trailer assembly of the present invention to transport the job box, the cargo area of the tow vehicle can be reserved for larger construction supplies.

DESCRIPTION OF THE PREFERRED EMBODIMENT

Figure 1:
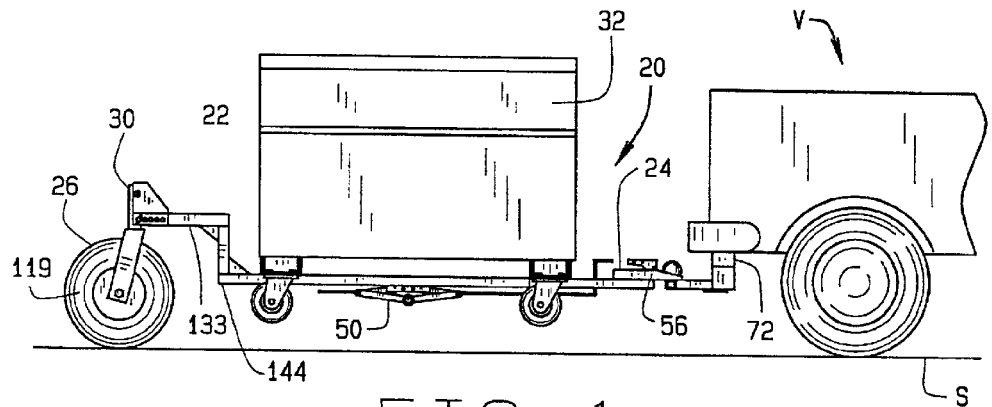
FIG. 1 is a side plan view the job box trailer system of the present invention attached to the rear of a tow vehicle.
Figure 2:
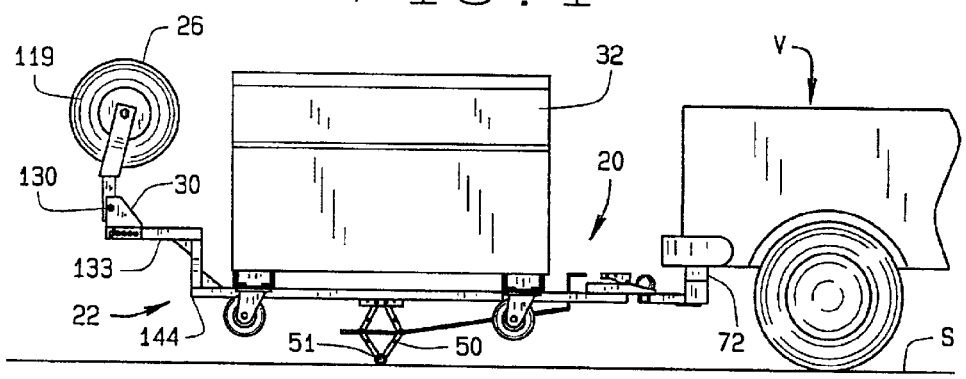
FIG. 2 is a side plan view of the job box trailer system attached to the tow vehicle and resting on the jack apparatus, with the wheel rotated up.
Figure 3:
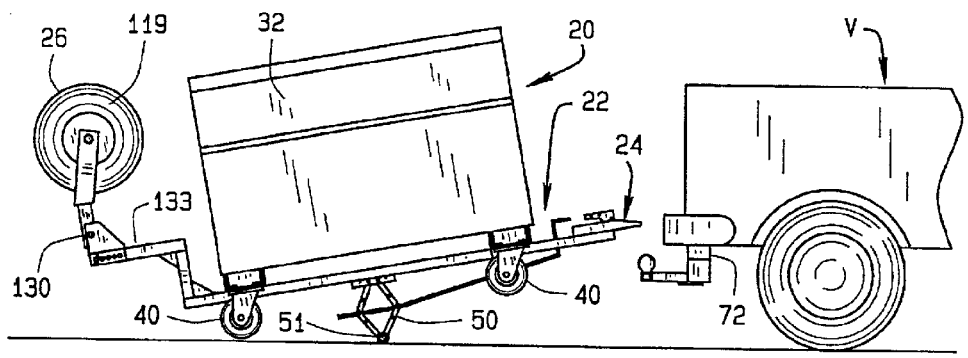
FIG. 3 is a side plan view of the job box trailer system raised on the jack positioned for attachment to, or after disattachment from, the rear of a tow vehicle.

Referring now to the figures, FIGS. 1 through 3 illustrate one preferred embodiment of the job box trailer system of the present invention, indicated generally by reference numeral 20, attached to the rear of a tow vehicle V for transport. As can be seen, the system includes a single wheeled trailer 22 having a trailer hitch assembly 24 at the front end for attachment to the tow vehicle V and a single wheel assembly 26 at the other end of the trailer. Wheel 26 is attached to the trailer body itself by a pivot apparatus 30 so that wheel 26 can be rotated or pivoted down into a road-engaging position, as seen in FIG. 1 or up, as shown in FIG. 2. More than one wheel can be employed on the trailer if it includes means for pivoting the wheels up when the assembly is resting on the ground, in use.

Figures 5A, 5B:
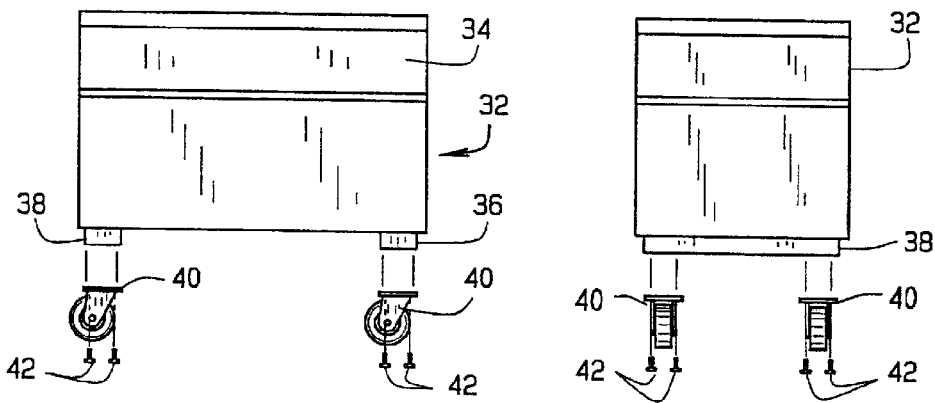
FIG. 5A is a side plan view job box alone, with the casters removed.
FIG. 5B is an end plan thereof.

A job box 32 is secured to the trailer, as now will be explained. The job box 32, as seen in greater detail in FIGS. 5A and 5B, can be a conventional, rugged equipment storage box of conventional design made from steel, for example. One embodiment of the job box is a large, durable container, rectangular in configuration, generally 36" tall by 60" long by 30" in height and can weigh about 300 pounds. The job box has an access door 34 to allow access to the inside of the box. The interior of the box can be designed with any acceptable configuration of storage compartments, shelves or the like. One typical type box is provided by Knaack Manufacturing, Crystal Lake, Ill.

Figure 4:
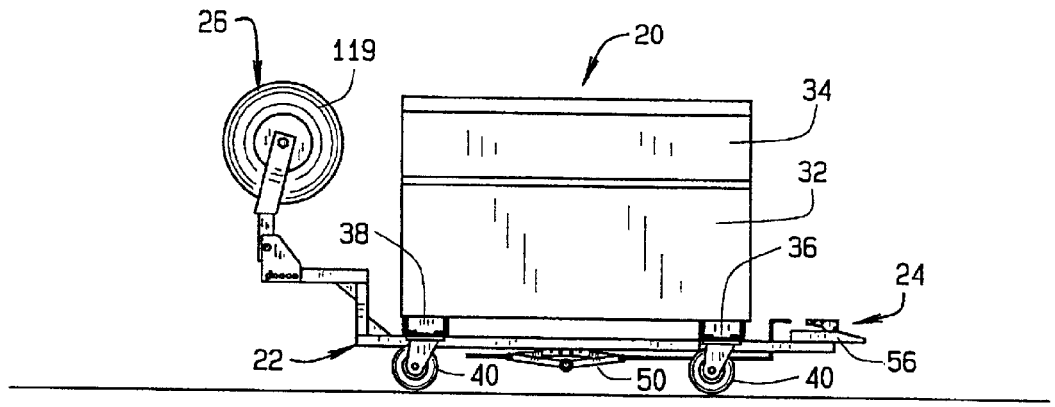
FIG. 4 is a side plan view of the job and trailer, resting on the casters.
Figure 6:
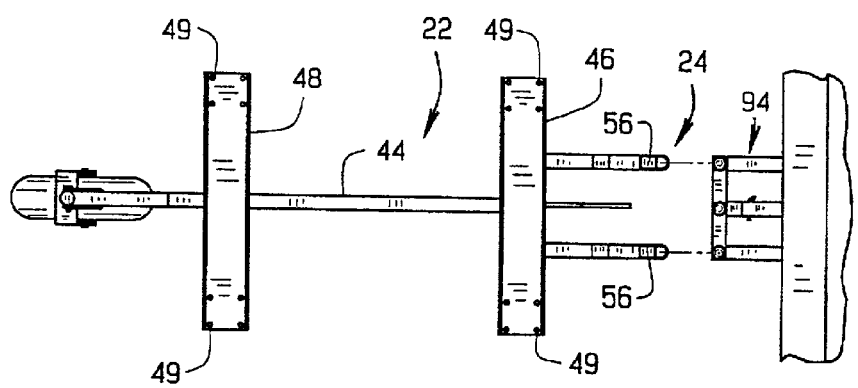
FIG. 6 is top plan view of the trailer alone.

The box has transverse bottom skids 36, 38 positioned at each end for support. Some models may have a third skid positioned intermediate of the end skids. In the event a three-skid box is employed, trailer 22 can include an intermediate cross channel or the middle skid can be removed. The box should be provided with casters 40, which can be attached with bolts 42 or the like into the bottom of the skids to allow the rolling movement of the box, if the box is employed outside the system of the present invention. When employed in the system of the present invention, the casters provide rolling and support for the assembly sitting on a surface S, as shown in FIG. 4. The trailer 22 is shown in greater detail in FIG. 6.

In the illustrated embodiment, trailer 22 has substantially rigid and stable frame including an elongated center rail 44 with a forward cross channel member 46 and a rear cross channel member 48. The cross channels 46 and 48 are dimensioned to snugly seat transverse bottom skids 36 and 38, respectively, and provide mounting structure for the storage container, as will be explained. There is a set of four caster mounting holes, as shown at 49, in each end of each channel. Referring back to the construction of trailer 22, as shown in FIGS. 1–3, there is a crank actuated scissors jack 50 mounted on the bottom of the center rail, approximately at the midpoint. Jack 50 includes small wheels 51. Jack 50 is positioned somewhat toward the front end of the trailer so that actuation of the jack raises the front end of the trailer so the trailer hitch assembly can be attached to the tow vehicle, as shown in FIG. 2 and as will be explained below. It should be understood that the illustrated embodiment includes one central rail. However, other configurations of a frames including one or more rails which provide for the mounting of cross channels and for a stable and rigid trailer frame are included within the scope of the invention.

Figure 7:
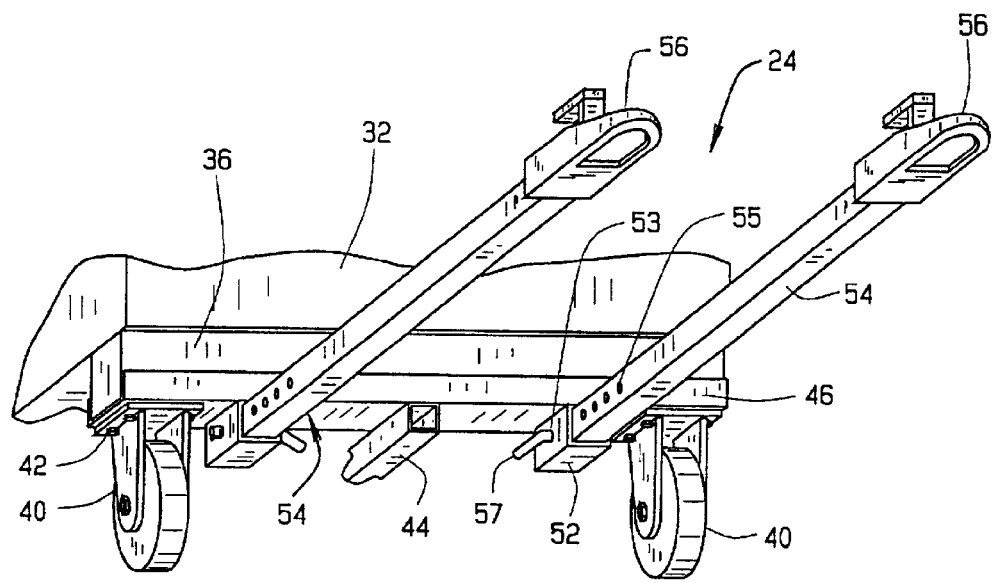
FIG. 7. is a bottom perspective view of the trailer two-point hitch assembly.

As shown, job box 32 is safely mounted on trailer 22. With the casters removed, 36 seats in channel 46 and skid 38 seats in channel 48. The four casters are positioned under the caster mounting holes 49 in each end of the channels. The caster bolts 40 are inserted up through the casters and caster mounting holes 49 and tightened into the skids. This unique exemplary arrangement, which is detailed in FIG. 7, provides for secure mounting of the box.

A two-point trailer hitch assembly 24 is mounted to the bottom side of the forward channel. As best seen in FIG. 7, one side of the two-point hitch assembly includes a first sleeve 52 mounted to the bottom of the channel. The sleeve includes a locking pin hole 53 formed through it. An adjustable tongue 54 is slidably mounted within the sleeve. Tongue 54 includes a plurality of linearly aligned holes 55 formed through it. The length of the tongue is adjusted to the desired length and a locking pin 57 is inserted through the sleeve and tongue to hold the tongue in place. The pin can be removed and the tongue slid back under the trailer frame or the tongue can be totally removed and stored, for example, in the box, when the assembly is situated at a job site. The tongue has a conventional trailer hitch 56 on its front end. A second identical sleeve and tongue sleeve combination, indicated generally by reference number 58 is attached to the forward channel and spaced apart from the first tongue and sleeve combination and appropriate distance so that the trailer hitches, e.g. 56, properly engage a pair of hitch balls appropriately mounted on the tow vehicle V.

Figure 9:
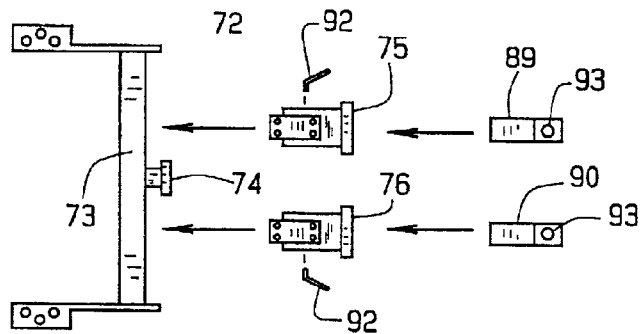
FIG. 9 is top plan of another hitch adapter for a conventional trailer hitch.
Figure 10:
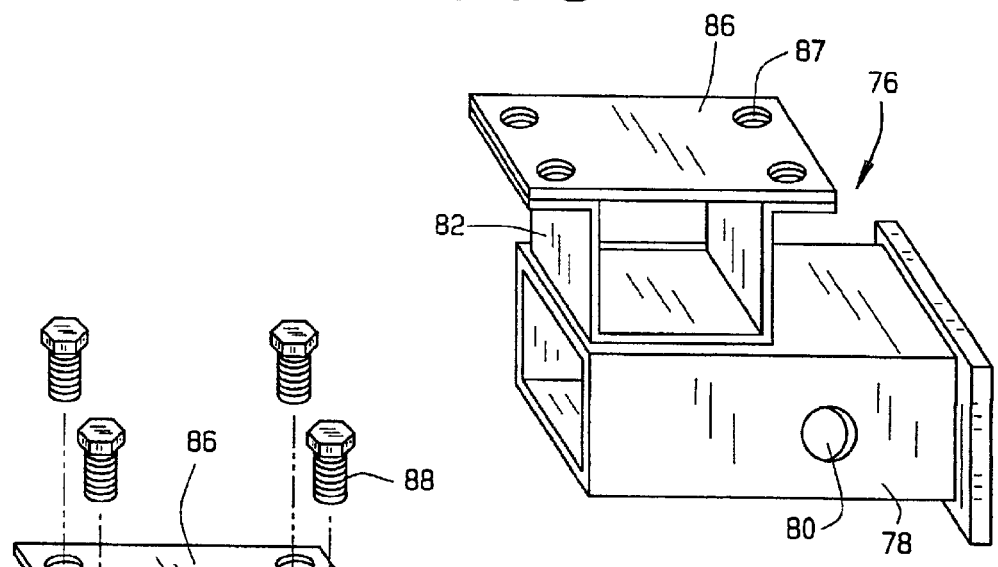
FIG. 10 is an enlarged perspective view of side view of the hitch adapter.
Figure 11:
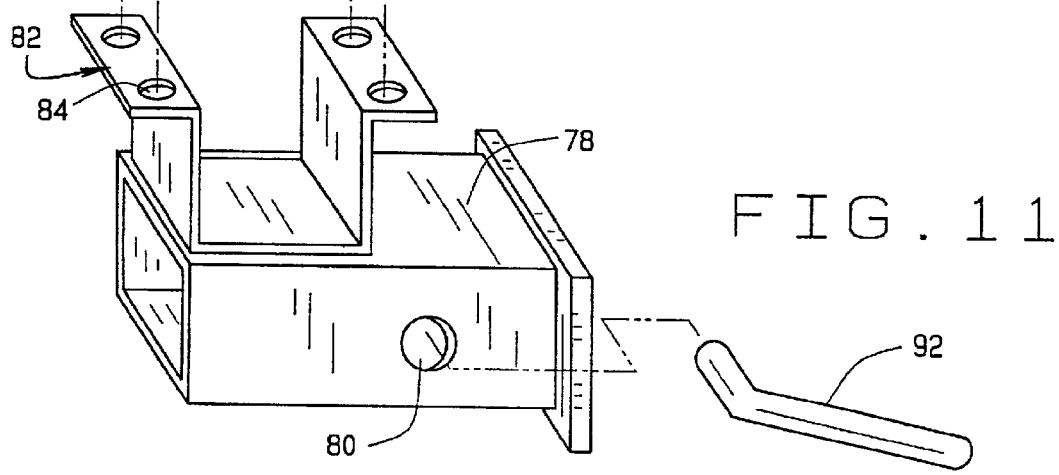
FIG. 11 is another perspective view of side view of the hitch adapter disassembled.

As seen in FIG. 9, tow vehicle hitch receiver, indicated generally at 72 can be adapted to provide for a two point hitch. The standard hitch receiver 72 is appropriately positioned and mounted under the rear end of the tow vehicle, as known to the art. The hitch receiver 72 includes a cross member 73 with a standard center receiver tube 74. Sleeves 75 and 76, which also can be referred to as a receiver tubes, are attached to the cross member 73. FIGS. 10 and 11 better illustrate a sleeve. As shown, the sleeve includes a body 78 with a locking pin hole 80 is formed through the body when a locking pin us used. There is a mounting bracket 82 on the top surface of the body. The mounting bracket 82 has four mounting holes 84. Bracket 82 is positioned on the bottom surface of the hitch receiver cross member so that the mounting holes 84 align with mounting holes in backing plate 86, having four mounting holes 87, is positioned on the top surface of the cross member and the recited mounted holes are aligned. Bolts 88 are introduced through the recited mounting holes and tightened to secure the sleeve to the cross member. The recited holes can be threaded to receive the threaded bolt or a nut (not shown) is used.

As best seen in FIG. 9, in one embodiment individual ball mounts 89 and 90 are introduced into the sleeves and secured in place with locking pins 92. Hitches 56 on the forward end of the trailer are attached to the hitch balls 93 on the ball mounts to provide a two-point hitch.

Figure 8:
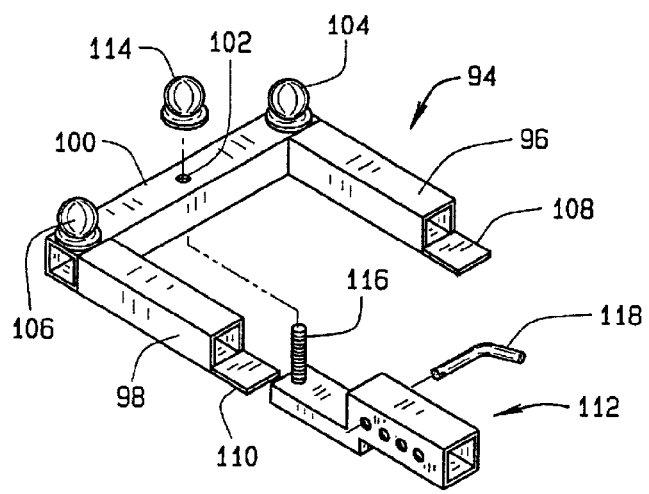
FIG. 8 is perspective view of a U-shaped ball mount.

In a preferred embodiment, a U-shaped ball mount 94 as shown in FIG. 8 having two parallel arms 96, 98 and cross member 100 at one end of the arms, is attached to the hitch receiver and sleeve combination 72 of FIG. 9 in place of the two individual ball mounts 89 and 90. The cross member 100 has a central hole 102 and a first hitch ball 104 at one end and a second hitch ball 106 at the opposite end. It will be noted that the length of the cross member 100 is such that the hitch balls 104 and 106 will align with the hitches 56 on the trailer. In any event, the arms 96 and 98 have flat bottom braces 108 and 110 at the ends respectively.

A standard ball mount 112, with hitch ball 114, is secured in the center hitch receiver 74. The ball 114 is removed and the threaded ball stem 116 is inserted up through hole 102 in the center of cross member 100. The ball 114 is tightened down on the stem to secure the U-shaped ball mount tightly to the ball mount. The ball mount 112 is inserted into the hitch receiver 74 and the U-shaped ball mount is positioned so that braces 108 and 110 securely abut the underside of hitch receiver 72. A locking pin 118 is inserted through the hitch receiver 74 and ball hitch 112 in a conventional manner to secure the U-shaped ball mount in place. Alternatively, the free ends of arms 96 and 98 could be introduced into sleeves 75 and 76 (FIG. 9) and locked in place with pins.

It will be noted that the hitch receiver assemblies described, in combination with the two hitches 56 on the trailer, provide a two-point attachment of the trailer 22 to the tow vehicle. This is particularly important when the trailer has only one wheel. The two-point attachment of the trailer to the tow vehicle prevents tipping, wobbling or swaying of the trailer when in use. Consequently, although only two embodiments of a two point hitching assembly are illustrated and described, it will be understood that any two point hitching assembly which can be used with a tow vehicle and the instant trailer is intended to fall within the scope of the invention.

Figure 16:
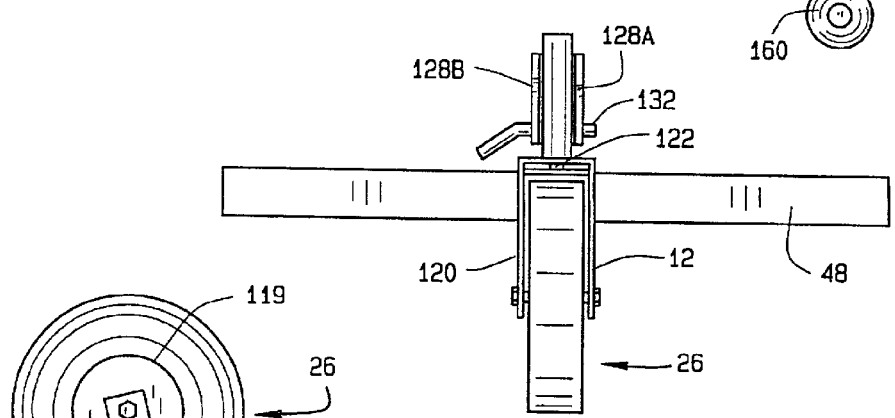
FIG. 16 is an end plan thereof.
Figure 15:
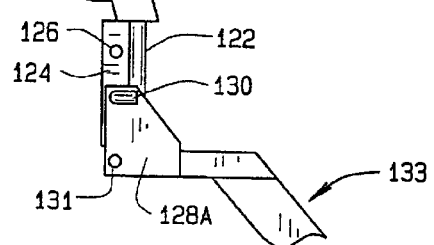
FIG. 15 is partial side plan view of the pivotable wheel assembly.

FIG. 1 shows the job box trailer system mounted to the tow vehicle, the wheel assembly 26 pivoted down in a road engaging position and ready for towing. The pivotal design of the wheel assembly 26 is better seen in FIGS. 15 and 16. The wheel assembly 26 includes a conventional wheel and tire combination 119 mounted at the axle in fork 120. Fork 120 is attached to a swivel 122, which allows the wheel to turn appropriately when the trailer is being towed. The swivel 122 is attached along its length to one side of strut 124. Strut 124 has a plurality of locking pin holes 126 along its length. Strut 124 is positioned between two triangular plates 128A and 128B and mounted on a pivot 130 that can be a bolt or the like. The plates have vertically aligned locking pin holes 131.

A locking pin 132 is inserted through the locking pin holes in the triangular plates and strut 124 to secure the strut in position. Pin 132 can be removed and the fork and swivel assembly rotated up or down between the plates and secured in the desired position by the reinsertion of the locking pin 132. Wheel assembly 26 is attached to the trailer center rail 44 by an L-shaped frame, indicated generally as 133, that allows the wheel and tire 119 to properly engage the surface during towing while keeping the job box trailer assembly substantially parallel to surface S. Any type of attachment configuration that accomplishes that function is acceptable.

FIG. 2 illustrates the scissors jack 50 fully actuated to maintain the trailer and job box assembly elevated above the surface S. The wheel assembly is rotated up and out of the way. With the hitches 56 attached to the hitch balls, the jack is reversed until the rear casters engage the surface. The hitches 56 are unlocked from the hitch balls and the assembly tilts backwards pivoting on jack wheels 51 while the rear casters engage the surface, as shown in FIG. 3. The tow vehicle can be moved out of the way and jack 50 reversed until the front casters engage the surface. The assembly can be rolled on the casters to a desired location. The casters can be locked to keep the assembly from moving.

As also shown in FIG. 3 the front of the trailer can be elevated by the jack and the tow vehicle appropriately positioned under the hitches. The trailer can be moved in position under the hitches by rolling on the rear casters and jack wheels 51. The trailer can be raised with the jack to a horizontal position and the hitches 56 secured to the hitch balls, again as shown in FIG. 2. The wheel assembly 26 is rotated down into a surface engaging position and the assembly of the present invention is ready to be towed to another site.

Figure 12:
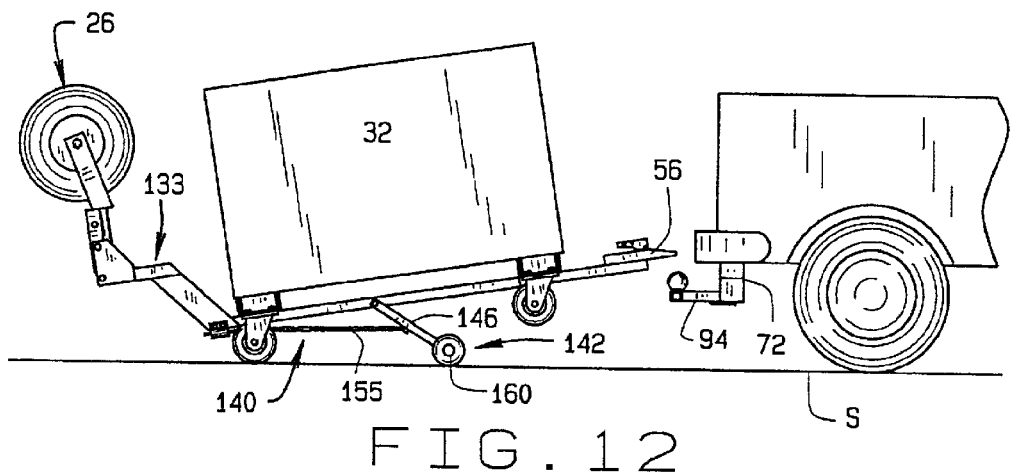
FIG. 12 is a side plan view of another embodiment of the job box trailer system of the present invention.
Figure 13:
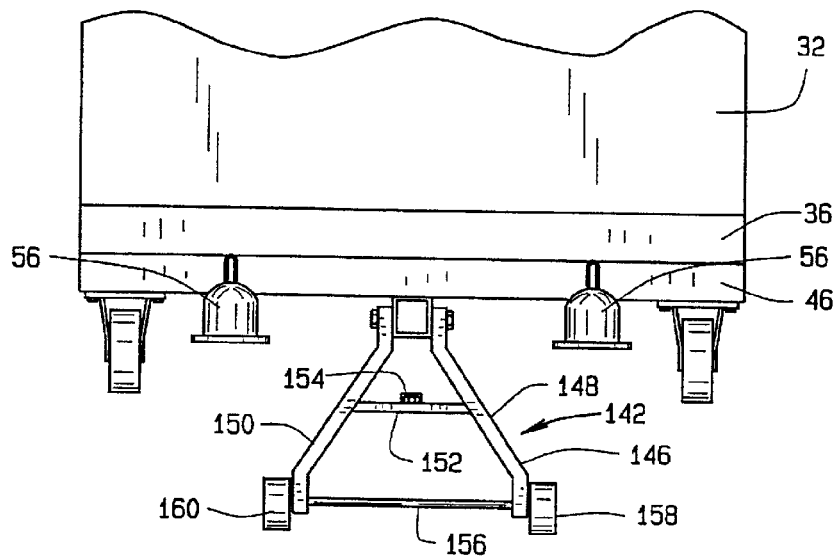
FIG. 13 is an end plan thereof.
Figure 14:
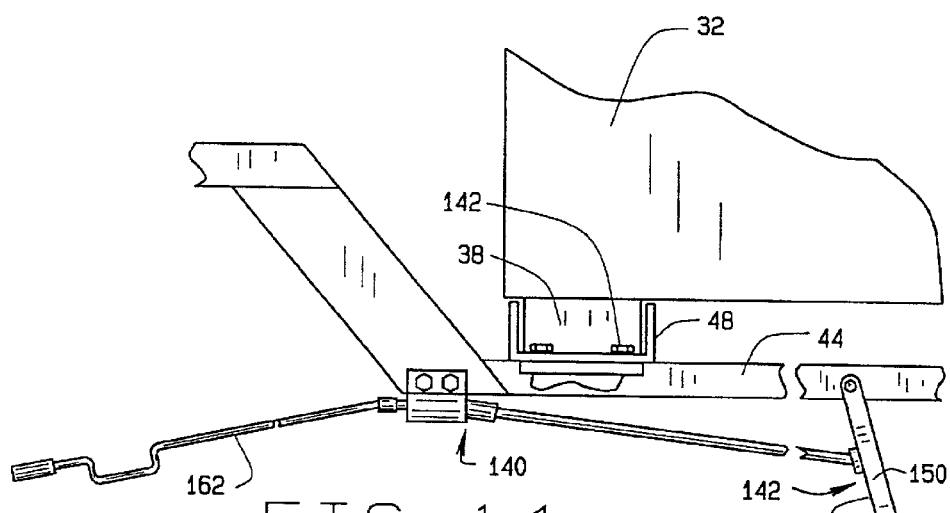
FIG. 14 is a partial, side elevational view showing the screw jack and wheel assembly.

FIGS. 12 through 14 illustrate another preferred embodiment of a job box trailer assembly employing a screw jack 140 operably connected to a retractable wheel assembly 142. The retractable wheel assembly is pivotally attached to the center rail as at 144. Wheel assembly 142 includes a frame 146 including opposed angled struts 148 and 150 connected by a cross brace 152 which has a centrally positioned pivotal attachment 154 for attachment of the forward extension 155 of the screw jack An axle 156 extends between the lower ends of the struts and wheels 158 and 160 are appropriately attached to the ends of the axle. As seen in FIG. 13, the wheel assembly generally has a triangular configuration providing a strong and supportive design.

Referring to FIG. 14, a removable jack handle 162 engages the screw jack assembly. Rotation of the jack handle in a first direction causes the forward extension 155 of the screw jack to move forward to lower the wheel assembly 142 as it rotates about pivot 130. The jack can be actuated until the wheel assembly elevates the front of the trailer and the hitch assemblies to a desired level or until the entire job box trailer assembly is elevated in a manner similar to the embodiment depicted in FIG. 2. Reversal of the screw jack causes the wheel assembly 142 to be retracted to rail 44.

The wheel assembly 142 of the exemplary embodiment of FIGS. 12 through 14 allows for somewhat easier movement of the trailer on the larger wheels, for example, for fine positioning of the trailer hitches 56 over the hitch balls during attachment to the tow vehicle or when moving the trailer assembly away from the tow vehicle while the front end of the assembly is elevated, prior to lowering the front casters to a surface engaging position. Although the drawings show two types of jack assemblies, it will be understand that these are exemplary embodiments of jack apparatus and any jack apparatus is encompassed by the scope of the claims. Other types of jack apparatus include, but are not limited to, pneumatic jacks, hydraulic jacks, electric jacks or the like.

It will be noted that the job box trailer assembly of the present invention can be used by a single individual to transport a job box back and forth to a job site. As can be appreciated from the foregoing description, the job/box trailer assembly of the present invention meets and exceeds the objectives set out above.

What is claimed is:

1. A transportable storage container assembly comprising:
a trailer having a frame, a hitch assembly at a first end of the frame and at least one wheel assembly at a second end of the frame, a first U-shaped cross channel adjacent the first end of the frame and a second U-shaped cross channel adjacent the second end of the frame;
a removable storage container mounted on the trailer, said storage container having a first transverse bottom support member on a first end and a second transverse bottom support member on a second end, said first bottom support member seated in said first U-shaped cross channel and said second bottom support member seated in said second U-shaped cross channel;
storage container supports extending through said cross channels for engaging said bottom support members within said cross channels and removably securing the mounted storage container to the trailer; and a jack apparatus positioned adjacent a midline of the frame for raising or lowering the trailer, wherein the storage container can be transported and employed as a storage container when mounted on the trailer and removed and employed as a storage container independent of the trailer.

2. The transportable storage container assembly of claim 1 wherein said wheel assembly is pivotable between a surface engaging position and a non-surface engaging position.

3. The transportable storage container assembly of claim 1 wherein said storage container supports further comprise casters positioned on a lower surface of the cross channel and attached to the support member seated in the cross channel.

4. The transportable storage container assembly of claim 1 wherein said hitch assembly is a two-point hitch assembly.

5. The transportable storage container assembly of claim 1 wherein the jack apparatus is a scissors jack.

6. The transportable storage container assembly of claim 1 wherein the jack apparatus includes a screw jack.

7. The transportable storage container assembly of claim 6 wherein the jack apparatus further comprises a retractable frame having a support wheel and axle assembly rotatably mounted thereto, said screw jack operatively connected to said frame to retract the frame toward the trailer to lower the trailer and to protract the frame away from the trailer to raise the trailer.

8. The transportable storage container assembly of claim 7 wherein the retractable frame comprises a generally triangular frame.

9. The transportable storage container assembly of claim 1 wherein said frame comprises a center rail extending from the first end to the second end of the frame.

10. A transportable storage container and trailer assembly comprising:

a trailer comprising one center rail, a two point hitch assembly at a first end of the center rail for attachment to a tow vehicle and a pivotable surface engaging wheel assembly at a second end of the center rail for rolling support of the trailer when transported across a surface, a forward U-shaped cross channel having a first end with mounting holes formed therein and a second end having mounting holes formed therein and a rear U-shaped cross channel having a first end with mounting holes formed therein and a second end having mounting holes formed therein;

a storage container removably mounted on the trailer, said storage container having a first transverse support member on a first bottom end and a second transverse support member on a second bottom end, said first support member engaged in said first U-shaped cross channel and said second support member engaged in said second U-shaped cross channel;

bolts positioned under each end of the cross channels, said bolts attached to said storage container support members through the recited mounting holes to secure said support members in said cross channels; and a jack apparatus under the center rail for elevating and lowering the assembly for attachment to or disengagement from the tow vehicle.

11. The transportable storage container and trailer assembly of claim 10 further comprising a caster positioned under each end of the of the cross channels, each caster being connected to the cross channel by said bolts, wherein said casters provide support and mobility to said storage container and trailer assembly when said storage container and trailer assembly is disengaged from the tow vehicle.

12. The transportable storage container assembly of claim 10 wherein the two point hitch assembly further comprises:

a first sleeve on the forward U-shaped cross channel and a second, spaced apart sleeve on the forward U-shaped cross channel;

a first elongated tongue member having a first end adjustably secured in the first sleeve and extending therefrom and a second elongated tongue member having a first end adjustably secured in the second sleeve and extending therefrom; and a first trailer hitch on a second end of the first elongated tongue member and a second trailer hitch on a second end of the second elongated tongue member.

13. The transportable storage container assembly of claim 12 wherein said first and second elongated tongue members are removable.

14. The transportable storage container assembly of claim 10 wherein said pivotable surface engaging wheel assembly is attached to the center rail by a generally L-shaped frame that maintains the trailer assembly substantially parallel to the surface during transportation.

15. The transportable storage container assembly of claim 10 wherein the jack apparatus is a scissors jack.

16. The transportable storage container assembly of claim 10 wherein the jack apparatus is a screw jack assembly.

17. A transportable storage container assembly and tow vehicle combination comprising:

a tow vehicle having a hitch receiver attached at a rear end, said hitch receiver including a pair of spaced apart hitch balls;

a trailer comprising at least one a center rail, the trailer being removably attached to the hitch balls by a two-point hitch assembly positioned at a first end of the center rail and a wheel assembly at a second end of the rail for rolling support of the trailer on a surface, the trailer further comprising a first cross channel adjacent the first end of the rail and a second cross channel adjacent the second end of the rail;

a storage container removably mounted on the trailer, said storage container having a first transverse bottom support member on a first end and a second transverse bottom support member on a second end, said first support transverse bottom support member engaged in said first cross channel and said second transverse bottom support member engaged in said second cross channel;

attachment apparatus for extending through said first cross channel and said second cross channel for engaging and releasably securing said transverse support members to said cross channels whereby said storage container can be releasably secured to the trailer for transport; and a jack apparatus under the center rail adjacent a midline of the trailer for raising or lowering the trailer.

18. The combination of claim 17 wherein said hitch receiver includes a receiver tube positioned centrally thereon and a ball mount removably secured to the hitch receiver at the receiver tube, the ball mount including a first arm and a spaced apart second arm with a cross member therebetween, one each of the pair of spaced apart hitch bails attached to opposite ends of the cross member.

19. The combination of claim 17 wherein the attachment apparatus further comprises a plurality of casters, wherein each caster extends through said cross channels to secure said support members to said cross channels, said casters can be removed to release the storage container from the trailer and said casters can be reattached directly to said cross members to provide support and mobility to the storage container when said storage container is placed on a support surface and used as a storage container independent of the trailer.

20. The combination of claim 17 wherein said hitch receiver includes a first ball mount sleeve and a second ball mount sleeve, a first ball mount removably secured in the first ball mount sleeve and a second ball mount removably secured in the second ball mount sleeve, one of the pair of spaced apart hitch balls mounted on the first ball mount and the other of the pair of hitch balls mounted on the second ball mount.

21. A storage container and trailer assembly for transport by a tow vehicle comprising:
   a trailer comprising a center rail extending the length of the trailer, a two point hitch assembly at a first end of the rail for attachment to a tow vehicle and a pivotable road-engaging wheel assembly at a second end of the rail, a forward cross channel and a rear cross channel, said two point hitch assembly being attached to said forward cross channel;
   a structurally independent storage container removably mounted on the trailer, said storage container having a first transverse support member on a first bottom end and a second transverse support member on a second bottom end, said first transverse support member engaged in said first cross channel and said second transverse support member engaged in said second cross channel;
   removable casters for securing said support members in said cross channels, said removable casters also providing support and mobility to the storage container and trailer assembly when the assembly is disengaged from the tow vehicle and placed directly on a support surface; and
   a jack on the center rail for elevating and lowering the assembly.

22. A hitch assembly for attachment to a hitch receiver on a tow vehicle, the hitch receiver having a single, centrally positioned hitch receiver tube, to facilitate attachment and towing of a trailer having a two-point hitch assembly by the tow vehicle, comprising:
   a ball mount having a first end removably secured in the single hitch receiver tube and a cross member at a second end of the ball mount;
   a first support arm extending between a first end of the cross member and the tow vehicle hitch receiver and a second, spaced apart support arm extending between a second end of the cross-member and the tow vehicle hitch receiver;
   a first hitch ball on the first end of the cross member and a second hitch ball on the second end of the cross member, said recited hitch balls being attachable to the two-point hitch assembly on the trailer.

* * * * *

UNITED STATES PATENT AND TRADEMARK OFFICE
CERTIFICATE OF CORRECTION

PATENT NO. : 6,755,433 B2 Page 1 of 1
DATED : June 29, 2004
INVENTOR(S) : Gerald W. Krauss It is certified that error appears in the above-identified patent and that said Letters Patent is hereby corrected as shown below:

Column 8,
Line 64, replace "bails" with -- balls --

Signed and Sealed this

Twenty-third Day of November, 2004

JON W. DUDAS
*Director of the United States Patent and Trademark Office*